(No Model.)

H. H. BAKER.
HOLDBACK FOR VEHICLES.

No. 306,048. Patented Oct. 7, 1884.

WITNESSES.  
J. J. Greenough  
E. J. Remmington

INVENTOR  
Henry H. Baker

UNITED STATES PATENT OFFICE.

HENRY H. BAKER, OF SYRACUSE, NEW YORK.

HOLDBACK FOR VEHICLES.

SPECIFICATION forming part of Letters Patent No. 306,048, dated October 7, 1884.

Application filed April 28, 1884. (No model.)

*To all whom it may concern:*

Be it known that I, HENRY H. BAKER, of Syracuse, county of Onondaga, State of New York, have invented a new and useful Improvement in Safety-Holdbacks for Vehicles, of which the following is a specification.

My invention relates to holdbacks for vehicles to which the breeching is affixed, so constructed as to be readily attached to or detached from the shafts, and serving as a safety-guard in releasing the breeching-straps from the shafts in case of accident, as well as affording a more convenient way of uniting and unhitching a horse to the shafts, while it is so constructed as not to rattle or become detached while in use. I attain these objects by the device shown in the accompanying drawings, in which—

Figure 1:
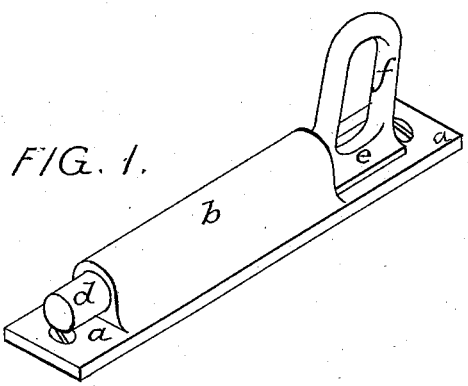
Figure 2:
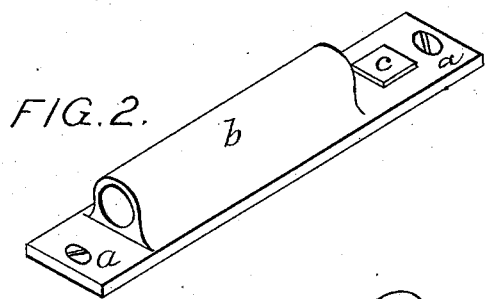
Figure 3:
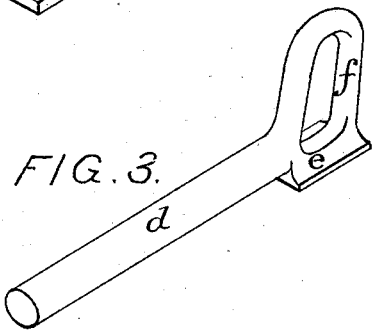

Figure 1 is a perspective view of the holdback; Fig. 2, the plate $a$ as it is affixed to the shaft; Fig. 3, the loop-base and shank of the holdback detached.

The reference-letters are the same on all the figures.

$a$ is an oblong plate, affixed by means of screws, bolts, or other fastening to the shafts of the vehicle. On this plate is a socket or tube, $b$. There is an opening or recess in the plate in front of the socket, in which a piece of india-rubber, leather, or other elastic medium, $c$, is affixed, projecting above the surface of the plate.

$f$ is a loop attached to a base-piece, $e$, flat on its under side, and having a straight round rod or shank, $d$, projecting rearward from it.

To attach the parts, the shank $d$ is slipped into the socket $b$. The flat part of the base $e$ of loop $f$ rests on plate $a$ over the elastic medium $c$, and is held steady and prevented from rattling, and by it the loop $f$ is held up steadily, and the shank of the loop is secured against slipping out of the socket by jarring or otherwise.

The parts can be readily separated when desired, thus affording safety in case of danger, and convenience in hitching or unhitching.

Having thus described my improvement, I claim—

1. The combination of a socket and attachment, $a$ $b$, and loop $f$, having a base, $e$, and shank $d$ connected therewith, as and for the purposes herein specified.

2. The combination of the socket attachment $a$ $b$ and loop-fixtures $d$ $e$ $f$ with the elastic medium $c$, in the manner and for the purposes described.

HENRY H. BAKER.

Witnesses:
T. E. HANCOCK,
E. D. REMINGTON.